United States Patent
Fujisaki et al.

(10) Patent No.: US 11,189,842 B2
(45) Date of Patent: Nov. 30, 2021

(54) ELECTROCHEMICAL CELL

(71) Applicant: NGK INSULATORS, LTD., Nagoya (JP)

(72) Inventors: Shinji Fujisaki, Kuwana (JP); Takashi Ryu, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/907,846

(22) Filed: Jun. 22, 2020

(65) Prior Publication Data

US 2020/0321627 A1 Oct. 8, 2020

Related U.S. Application Data

(63) Continuation of application No. PCT/JP2020/000631, filed on Jan. 10, 2020.

(30) Foreign Application Priority Data

Jan. 30, 2019 (JP) .............................. JP2019-014748

(51) Int. Cl.
*H01M 4/90* (2006.01)
*H01M 8/02* (2016.01)
(Continued)

(52) U.S. Cl.
CPC ........... *H01M 4/9033* (2013.01); *H01M 8/02* (2013.01); *H01M 8/12* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 2013/0244132 A1* | 9/2013 | Ohmori | H01M 4/8663 429/482 |
| 2018/0131007 A1 | 5/2018 | Fujisaki et al. | |
| 2019/0088968 A1 | 3/2019 | Fujisaki et al. | |

FOREIGN PATENT DOCUMENTS

| | | |
|---|---|---|
| JP | 3180885 A | 7/1996 |
| JP | 200632132 A | 2/2006 |

(Continued)

OTHER PUBLICATIONS

International Search Report with English Translation issued in corresponding International Application No. PCT/JP2020/000631 dated Mar. 31, 2020 (6 pages).

(Continued)

*Primary Examiner* — Carmen V Lyles-Irving
(74) *Attorney, Agent, or Firm* — Flynn Thiel, P.C.

(57) ABSTRACT

An electrochemical cell includes a fuel electrode, an air electrode containing a perovskite type oxide as a main component, the perovskite type oxide being represented by a general formula $ABO_3$ and containing La and Sr at the A site, and a solid electrolyte layer arranged between the fuel electrode and the air electrode. The air electrode includes a first portion and a second portion, the first portion being located on the most upstream side in a flow direction of an oxidant gas that flows through a surface of the air electrode, the second portion being located on the most downstream side in the flow direction. A first ratio of a La concentration to a Sr concentration detected at the first portion through Auger electron spectroscopy is at least 1.1 times a second ratio of a La concentration to a Sr concentration detected at the second portion through Auger electron spectroscopy.

1 Claim, 1 Drawing Sheet

(51) Int. Cl.
  H01M 8/12 (2016.01)
  *H01M 8/124* (2016.01)

(56) References Cited

FOREIGN PATENT DOCUMENTS

| JP | 2012119212 A  | 6/2012 |
|----|---------------|--------|
| WO | 2017006943 A1 | 1/2017 |
| WO | 2018021484 A1 | 2/2018 |
| WO | 2018021490 A1 | 2/2018 |

OTHER PUBLICATIONS

Written Opinion of International Searching Authority with English Translation issued in corresponding International Application No. PCT/JP2020/000631 dated Mar. 31, 2020 (6 pages).

* cited by examiner

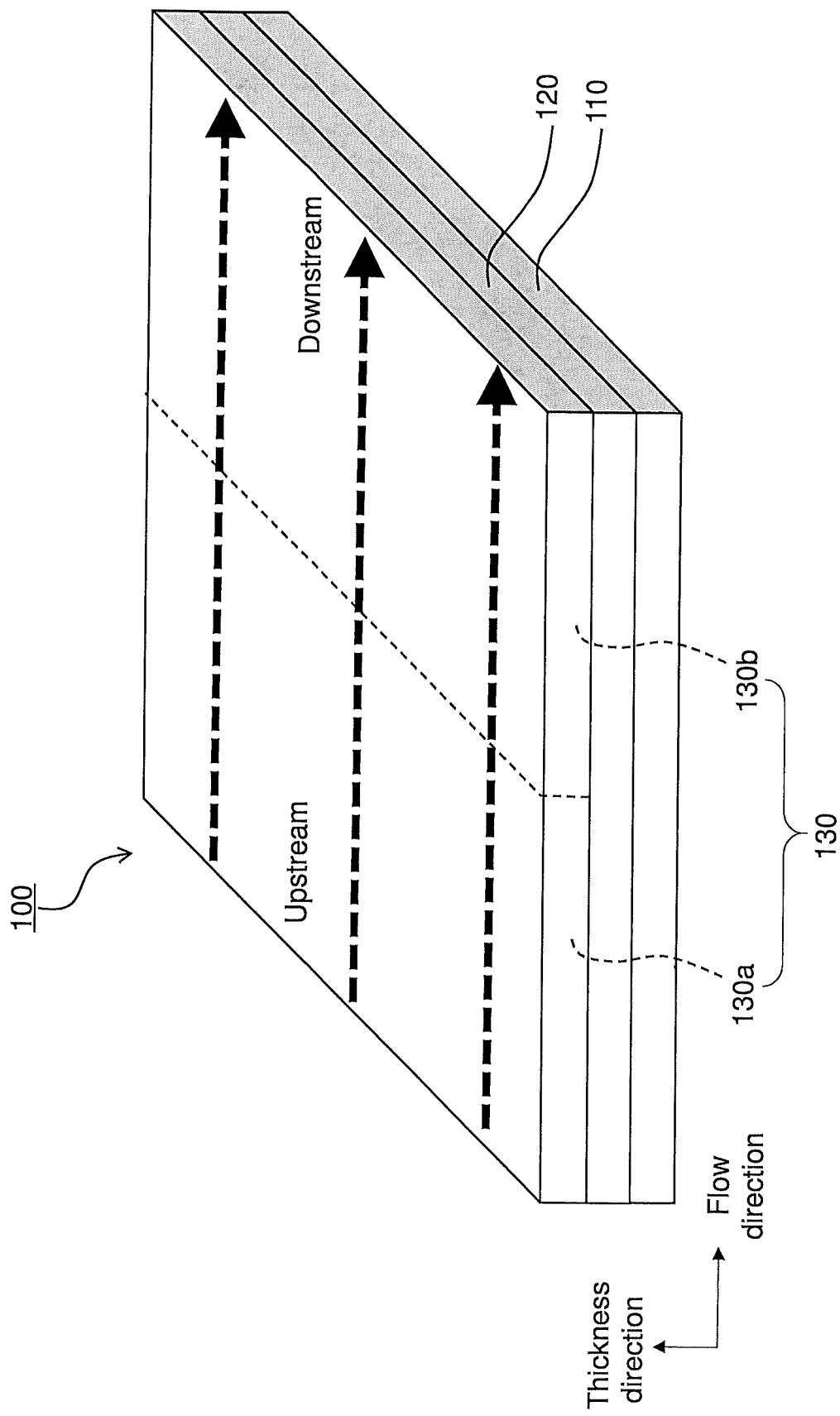

ELECTROCHEMICAL CELL

CROSS-REFERENCE TO RELATED APPLICATIONS

This is a continuation of PCT/JP2020/000631, filed Jan. 10, 2020, which claims priority to Japanese Application No. 2019-014748, filed Jan. 30, 2019, the entire contents of which are hereby incorporated by reference.

TECHNICAL FIELD

The present invention relates to an electrochemical cell.

BACKGROUND ART

In recent years, fuel cells, which are one type of electrochemical cell, are attracting attention from the standpoint of environmental problems and the effective utilization of energy resources. Fuel cells commonly include a fuel electrode, an air electrode, and a solid electrolyte layer that is arranged between the fuel electrode and the air electrode.

Perovskite type oxides, which are represented by a general formula $ABO_3$ and contain La (lanthanum) and Sr (strontium) at an A site, are preferable for the air electrode (see JP 2006-32132A, for example).

Examples of such perovskite type oxides include (La, Sr)(Co, Fe)$O_3$, (La, Sr)Fe$O_3$, (La, Sr)Co$O_3$, and (La, Sr)Mn$O_3$.

SUMMARY

Technical Problem

However, the output of a fuel cell may decrease as a result of power generation being repeated. Inventors of the present invention newly found that a reduction in the output is caused by deterioration of the air electrode, and one cause of the deterioration of the air electrode is formation of a compound by La contained in the air electrode and B (boron). Note that B comes to the air electrode from a member located in a surrounding region, such as a support portion that supports the fuel cell.

An object of the present invention is to provide an electrochemical cell with which a reduction in output can be suppressed.

Solution to Problem

An electrochemical cell according to the present invention includes a fuel electrode, an air electrode containing a perovskite type oxide as a main component, the perovskite type oxide being represented by a general formula $ABO_3$ and containing La and Sr at the A site, and a solid electrolyte layer arranged between the fuel electrode and the air electrode. The air electrode includes a first portion and a second portion, the first portion being located on the most upstream side in a flow direction of an oxidant gas that flows through a surface of the air electrode, the second portion being located on the most downstream side in the flow direction. A first ratio of a La concentration to a Sr concentration detected at the first portion through Auger electron spectroscopy is at least 1.1 times a second ratio of a La concentration to a Sr concentration detected at the second portion through Auger electron spectroscopy.

Advantageous Effects

According to the present invention, it is possible to provide an electrochemical cell with which a reduction in output can be suppressed.

BRIEF DESCRIPTION OF DRAWINGS

FIG. 1 is a perspective view showing a configuration of a fuel cell according to an embodiment.

DESCRIPTION OF EMBODIMENTS

Configuration of Fuel Cell 100

A configuration of a fuel cell 100, which is one example of an electrochemical cell according to the present embodiment, will be described with reference to the accompanying drawing. FIG. 1 is a perspective view of the fuel cell 100.

The fuel cell 100 is a so-called solid oxide fuel cell (SOFC: Solid Oxide Fuel Cell). The fuel cell 100 may be of various types such as a flat-tubular type, segmented-in-series type, a flat plate type, and a cylindrical type.

The fuel cell 100 includes a fuel electrode 110, a solid electrolyte layer 120, and an air electrode 130. Although there is no particular limitation on the shape of the fuel cell 100, the fuel cell 100 can have a square or rectangular plate shape having sides with a length of 10 to 300 mm, for example.

In the fuel cell 100, power is generated based on the following chemical reaction formulas (1) and (2) as a result of a fuel gas (e.g., hydrogen) being supplied to the fuel electrode 110 and an oxidant gas (e.g., air) being supplied to the air electrode 130.

$$(1/2) \cdot O_2 + 2e^- \rightarrow O^{2-} \text{ (in the air electrode 130)} \quad (1)$$

$$H_2 + O^{2-} \rightarrow H_2O + 2e^- \text{ (in the fuel electrode 110)} \quad (2)$$

The fuel electrode 110 is a porous body having a good gas permeability. The fuel electrode 110 functions as an anode of the fuel cell 100. The fuel electrode 110 is constituted by a substance that has an electron conductivity and a substance that has an oxygen ion conductivity. The fuel electrode 110 can be constituted by NiO-8YSZ (yttria stabilized zirconia) or NiO-GDC (gadolinium doped ceria), for example. Although there is no particular limitation on the thickness of the fuel electrode 110, the fuel electrode 110 can have a thickness of 50 to 2000 μm, for example. Although there is no particular limitation on the porosity of the fuel electrode 110, the fuel electrode 110 can have a porosity of 15 to 55%, for example.

The solid electrolyte layer 120 is arranged between the fuel electrode 110 and the air electrode 130. The solid electrolyte layer 120 is a compact body through which oxygen ions generated in the air electrode 130 can permeate. The solid electrolyte layer 120 functions as a seal film that prevents a fuel gas (e.g., hydrogen gas) from being mixed with an oxygen-containing gas (e.g., air).

The solid electrolyte layer 120 may contain $ZrO_2$ (zirconia) as a main component. The solid electrolyte layer 120 may also contain additives such as $Y_2O_3$ (yttria) and/or $Sc_2O_3$ (scandium oxide), in addition to zirconia. These additives function as stabilizers. A molar composition ratio of stabilizers to zirconia (stabilizers:zirconia) in the solid electrolyte layer 120 can be set to about 3:97 to 20:80.

Accordingly, examples of the materials of the solid electrolyte layer 120 include 3YSZ, 8YSZ, 10YSZ, and ScSZ (zirconia stabilized with scandia). The solid electrolyte layer 120 can have a thickness of 3 μm to 50 μm, for example. Although there is no particular limitation on the porosity of the solid electrolyte layer 120, the solid electrolyte layer 120 can have a porosity of 0 to 10%, for example.

The air electrode 130 is a porous body having good gas permeability. There is no particular limitation on the plane shape (external shape in a plan view) of the air electrode 130, and the plane shape may be a square, rectangular, circular, elliptical, or any other complex shape.

The air electrode 130 contains, as a main component, a perovskite type oxide that is represented by a general formula $ABO_3$ and contains La (lanthanum) and Sr (strontium) at the A site. Examples of such perovskite type oxides include, but are not limited to, (La, Sr) (Co, Fe)$O_3$ (lanthanum strontium cobalt ferrite), (La, Sr)Fe$O_3$ (lanthanum strontium ferrite), (La, Sr)Co$O_3$ (lanthanum strontium cobaltite), and (La, Sr)Mn$O_3$ (lanthanum strontium manganate). Although there is no particular limitation on the thickness of the air electrode 130, the air electrode 130 can have a thickness of 50 to 2000 μm, for example. Although there is no particular limitation on the porosity of the air electrode 130, the air electrode 130 can have a porosity of 15 to 55%, for example.

In the present embodiment, a substance Y "being contained as a main component" in a composition X means that the substance Y constitutes at least 70 weight % of the entire composition X.

As shown in FIG. 1, the air electrode 130 includes a first portion 130a and a second portion 130b.

Each of the first portion 130a and the second portion 130b extends in a plane direction that is perpendicular to a thickness direction of the air electrode 130. In a flow direction of an oxidant gas that flows through a surface of the air electrode 130, the first portion 130a is located on an upstream side of the second portion 130b. In the flow direction, the second portion 130b is located on a downstream side of the first portion 130a. The second portion 130b is a portion of the air electrode 130 other than the first portion 130a. In the example shown in FIG. 1, each of the first portion 130a and the second portion 130b has a rectangular plane shape, but the present invention is not limited to this configuration. The first portion 130a may also have an indeterminate plane shape, and the plane shape of the second portion 130b is determined according to the plane shape of the first portion 130a. Although there is no particular limitation on a plane size of the first portion 130a, the first portion 130a can have a plane size that is at least 25% and smaller than 75% of the entire plane area of the air electrode 130. Although there is no particular limitation on a plane size of the second portion 130b, the second portion 130b can have a plane size that is at least 25% and smaller than 75% of the entire plane area of the air electrode 130. Note that the thickness direction of the air electrode 130 is the same as a direction in which the fuel electrode 110, the solid electrolyte layer 120, and the air electrode 130 are layered.

The first portion 130a and the second portion 130b may also be formed as a single piece. That is, the first portion 130a and the second portion 130b need not have a clear boundary therebetween.

La/Sr Ratio at Air Electrode 130

A first ratio (La concentration/Sr concentration) Qa of a quantitative value of La (hereinafter referred to as an "La concentration") to a quantitative value of Sr (hereinafter referred to as an "Sr concentration") detected at the first portion 130a through Auger electron spectroscopy is at least 1.1 times a second ratio (La concentration/Sr concentration) Qb of an La concentration to an Sr concentration detected at the second portion 130b through Auger electron spectroscopy. That is, $Qa \geq 1.1 \times Qb$.

With this configuration, a composition ratio of La at the first portion 130a can be made sufficiently higher than a composition ratio of La at the second portion 130b to cause B (boron) to preferentially react with La contained in the first portion 130a during electric conduction. As a result of B being trapped by La contained in the first portion 130a as described above, B can be kept from reacting with La in the second portion 130b and forming a compound. Accordingly, a reduction in catalyst reaction activity at the second portion 130b can be suppressed, and the deterioration of the air electrode 130 as a whole can be suppressed. As a result, a reduction in the output of the fuel cell 100 can be suppressed.

The first ratio Qa at the first portion 130a is preferably not larger than 1.6 times the second ratio Qb at the second portion 130b. This configuration can reduce a difference in reaction activity between the first portion 130a and the second portion 130b during electrical conduction, and accordingly can suppress the local deterioration of the air electrode 130 due to the generation of a current density distribution. The first ratio Qa at the first portion 130a is more preferably not larger than 1.3 times the second ratio Qb at the second portion 130b.

Although there is no particular limitation on a numerical value range of the first ratio Qa at the first portion 130a, the first ratio Qa is preferably at least 0.3 and not larger than 0.55, for example. Although there is no particular limitation on a numerical value range of the second ratio Qb at the second portion 130b, the second ratio Qb is preferably at least 0.25 and not larger than 0.4, for example. With this configuration, the deterioration of the air electrode 130 can be further suppressed.

The following describes a method for determining the first ratio Qa at the first portion 130a and the second ratio Qb at the second portion 130b.

First, in a plan view of the air electrode 130, four first measurement points for calculating the first ratio Qa are arbitrarily selected from positions located at a distance of ¼ of the entire length of the air electrode 130 in the flow direction from an upstream end of the air electrode 130. Also, in the plan view of the air electrode 130, four second measurement points for calculating the second ratio Qb are arbitrarily selected from positions located at a distance of ¾ of the entire length of the air electrode 130 in the flow direction from the upstream end of the air electrode 130.

Next, La intensity data and Sr intensity data are obtained for each of the four first measurement points using a scanning Auger electron spectroscopy apparatus (manufactured by ULVAC-PHI, Inc., Model-710, electron beam acceleration voltage: 10 kV). Next, a La concentration is determined for each first measurement point by dividing the La intensity data by a La relative sensitivity factor, and a Sr concentration is determined for each first measurement point by dividing the Sr intensity data by an Sr relative sensitivity factor. Next, a mean La concentration is determined by calculating an arithmetic mean of the La concentrations of the four first measurement points, and a mean Sr concentration is determined by calculating an arithmetic mean of the Sr concentrations of the four first measurement points. Then, a value obtained by dividing the mean La concentration by the mean Sr concentration is taken to be the first ratio Qa.

Similarly, La intensity data and Sr intensity data are obtained for each of the four second measurement points using the scanning Auger electron spectroscopy apparatus (manufactured by ULVAC-PHI, Inc., Model-710, electron beam acceleration voltage: 10 kV). Next, a La concentration is determined for each second measurement point by dividing the La intensity data by the La relative sensitivity factor, and a Sr concentration is determined for each second measurement point by dividing the Sr intensity data by the Sr relative sensitivity factor. Next, a mean La concentration is determined by calculating an arithmetic mean of the La concentrations of the four second measurement points, and a mean Sr concentration is determined by calculating an arithmetic mean of the Sr concentrations of the four second measurement points. Then, a value obtained by dividing the mean La concentration by the mean Sr concentration is taken to be the second ratio Qb.

Note that the La relative sensitivity factor and the Sr relative sensitivity factor are determined according to the electron beam acceleration voltage of the scanning Auger electron spectroscopy apparatus. If the electron beam acceleration voltage is 10 kV, the La relative sensitivity factor is 0.652 and the Sr relative sensitivity factor is 0.059.

Method for Manufacturing Fuel Cell 100

A method for manufacturing the fuel cell 100 will be described.

First, a slurry is prepared by mixing a mixed powder (e.g., a mixture of an NiO powder and an YSZ powder) for forming the fuel electrode 110 with an organic binder and a solvent. Then, a fuel electrode sheet (a compact for the fuel electrode 110) is formed using the slurry.

Next, a slurry is prepared by mixing a powder (e.g., an YSZ powder) for forming the solid electrolyte layer 120 with water and a binder. Then, a solid electrolyte layer sheet (a compact for the solid electrolyte layer 120) is formed by applying the slurry to the compact for the fuel electrode 110.

Next, thermal treatment is performed on the compacts for the fuel electrode 110 and the solid electrolyte layer 120 to remove the binders, and then the compacts are fired together at 1300 to 1600° C. in an oxygen-containing atmosphere to obtain a co-fired body of the fuel electrode 110 and the solid electrolyte layer 120.

Next, powders (perovskite type oxide powders represented by a general formula $ABO_3$ and containing La and Sr at the A site) for forming the center portion 130a and the outer peripheral portion 130b of the air electrode 130 are prepared. A perovskite type oxide powder that has a larger composition ratio (La/Sr) of La to Sr than the perovskite type oxide powder for forming the center portion 130a is used as the perovskite type oxide powder for forming the outer peripheral portion 130b.

Next, a compact for the first portion 130a is formed by dipping an application liquid, which is obtained by dispersing a first portion material for forming the first portion 130a in a solvent, on a surface of the solid electrolyte layer 120.

Next, a compact for the second portion 130b is formed by dipping an application liquid, which is obtained by dispersing a second portion material for forming the second portion 130b in a solvent, to a region adjacent to the compact for the first portion 130a.

Next, the compact for the air electrode 130 is fired at 1000° C. to 1300° C. to form the air electrode 130.

Variations

The embodiment of the present invention has been described, but the present invention is not limited to this embodiment and various alterations can be made without departing from the gist of the present invention.

In the above-described embodiment, the fuel cell 100 is described as one example of the electrochemical cell, but the present invention can also be applied to electrochemical cells such as solid oxide electrolysis cells, as well as fuel cells.

In the above-described embodiment, the fuel cell 100 includes the fuel electrode 110, the solid electrolyte layer 120, and the air electrode 130, but the present invention is not limited to this configuration. For example, the fuel cell 100 may also include a barrier layer for suppressing the formation of a high resistivity layer between the solid electrolyte layer 120 and the air electrode 130. The barrier layer can be formed using a ceria-based material including ceria and a solid solution of ceria and a rare earth metal oxide, for example. Examples of such ceria-based materials include GDC (gadolinium doped ceria) and SDC (samarium doped ceria).

EXAMPLES

The following describes examples of fuel cells according to the present invention, but the present invention is not limited to the following examples.

Production of Samples No. 1 to No. 10

Fuel cells according to samples No. 1 to No. 10 were produced as described below.

First, a slurry that was obtained by mixing a blended powder of an NiO powder, a $Y_2O_3$ powder, and a pore-forming material (PMMA) with IPA was dried in a nitrogen atmosphere to prepare a mixed powder.

Next, the mixed powder was pressed using a uniaxial press (compacting pressure: 50 MPa) to form a plate having a length of 30 mm, a width of 30 mm, and a thickness of 3 mm, and the plate was further consolidated using a CIP (compacting pressure: 100 MPa) to form a compact for a fuel electrode power collection layer.

Next, a slurry that was obtained by mixing a blended powder of NiO-8YSZ and PMMA with IPA was applied to the compact for the fuel electrode power collection layer to form a compact for a fuel electrode active layer. Thus, a compact for the fuel electrode was obtained.

Next, a slurry for the solid electrolyte layer was prepared by mixing 8YSZ with terpineol and a binder. Then, the slurry for the solid electrolyte layer was applied to the compact for the fuel electrode to form a compact for the solid electrolyte layer.

Next, a GDC slurry was prepared and applied to the compact for the solid electrolyte layer to form a compact for a barrier layer.

Next, the compacts for the fuel electrode, the solid electrolyte layer, and the barrier layer were fired (at 1450° C. for 5 hours) to form a layered body constituted by the fuel electrode, the solid electrolyte layer, and the barrier layer.

Next, a first portion slurry was prepared by mixing a first portion material shown in Table 1 with terpineol and a binder. Also, a second portion slurry was prepared by mixing a second portion material shown in Table 1 with terpineol and a binder. As shown in Table 1, a material that had a larger composition ratio (La/Sr) of La to Sr than the second portion material was used as the first portion material.

Next, the first portion slurry and the second portion slurry were applied to the barrier layer in that order from the upstream side in the flow direction of the oxidant gas to form a compact for the air electrode.

Next, the compact for the air electrode was fired (at 1000° C. for 1 hour) to form the air electrode. In the flow direction, the first portion and the second portion had the same width.

La/Sr Ratio at First Portion and Second Portion of Air Electrode

First, in a plan view of the air electrode, four first measurement points for calculating the first ratio Qa were arbitrarily selected from positions located at a distance of ¼ of the entire length of the air electrode in the flow direction from the upstream end of the air electrode. Also, in the plan view of the air electrode, four second measurement points for calculating the second ratio Qb were arbitrarily selected from positions located at a distance of ¾ of the entire length of the air electrode in the flow direction from the upstream end of the air electrode.

Next, La intensity data and Sr intensity data were obtained for each of the four first measurement points using a scanning Auger electron spectroscopy apparatus (manufactured by ULVAC-PHI, Inc., Model-710, electron beam acceleration voltage: 10 kV). Next, a La concentration was determined for each first measurement point by dividing the La intensity data by a La relative sensitivity factor (=0.652), and a Sr concentration was determined for each first measurement point by dividing the Sr intensity data by a Sr relative sensitivity factor (=0.059). Next, a mean La concentration was determined by calculating an arithmetic mean of the La concentrations of the four first measurement points, and a mean Sr concentration was determined by calculating an arithmetic mean of the Sr concentrations of the four first measurement points. Then, the first ratio Qa was determined by dividing the mean La concentration by the mean Sr concentration.

Similarly, La intensity data and Sr intensity data were obtained for each of the four second measurement points using the scanning Auger electron spectroscopy apparatus (manufactured by ULVAC-PHI, Inc., Model-710, electron beam acceleration voltage: 10 kV). Next, a La concentration was determined for each second measurement point by dividing the La intensity data by the La relative sensitivity factor (=0.652), and a Sr concentration was determined for each second measurement point by dividing the Sr intensity data by the Sr relative sensitivity factor (=0.059). Next, a mean La concentration was determined by calculating an arithmetic mean of the La concentrations of the four second measurement points, and a mean Sr concentration was determined by calculating an arithmetic mean of the Sr concentrations of the four second measurement points. Then, the second ratio Qb was determined by dividing the mean La concentration by the mean Sr concentration.

Table 1 shows the first ratio Qa, the second ratio Qb, and the ratio of the first ratio Qa to the second ratio Qb.

Durability Test

Each of the samples from No. 1 to No. 10 was heated to 750° C. while supplying a nitrogen gas to the fuel electrode side and supplying air to the air electrode side, and once the temperature reached 750° C., a reduction treatment was performed for 3 hours while supplying a hydrogen gas to the fuel electrode.

Thereafter, a voltage drop rate per 1000 hours was measured as a deterioration rate. A value obtained at a temperature of 750° C. and a rated current density of 0.2 A/cm$^2$ was used. Table 1 shows the measurement results. In Table 1, samples having a deterioration rate lower than 1.0% are evaluated as "excellent", samples having a deterioration rate of at least 1.0% and lower than 1.1% are evaluated as "good", samples having a deterioration rate of at least 1.1% and lower than 1.2% are evaluated as "fair", and samples having a deterioration rate of at least 1.2% are evaluated as "poor".

TABLE 1

| Sample No. | Material for first portion on upstream side in flow direction of oxidant gas | Material for second portion on downstream side in flow direction of oxidant gas | First ratio Qa at first portion | Second ratio Qb at second portion | Qa/Qb | Deterioration rate (%) | Evaluation |
|---|---|---|---|---|---|---|---|
| 1 | $(La_{6},Sr_{4})(Co_{2},Fe_{8})O_{3}$ | $(La_{6},Sr_{4})(Co_{2},Fe_{8})O_{3}$ | 0.3 | 0.3 | 1.0 | 1.3 | Poor |
| 2 | $(La_{6.2},Sr_{3.8})(Co_{2},Fe_{8})O_{3}$ | $(La_{6},Sr_{4})(Co_{2},Fe_{8})O_{3}$ | 0.33 | 0.3 | 1.1 | 0.9 | Excellent |
| 3 | $(La_{7.2},Sr_{2.8})(Co_{2},Fe_{8})O_{3}$ | $(La_{6.7},Sr_{3.3})(Co_{2},Fe_{8})O_{3}$ | 0.5 | 0.4 | 1.3 | 0.75 | Excellent |
| 4 | $(La_{6.7},Sr_{3.3})(Co_{2},Fe_{8})O_{3}$ | $(La_{5.5},Sr_{4.5})(Co_{2},Fe_{8})O_{3}$ | 0.4 | 0.25 | 1.6 | 1.08 | Good |
| 5 | $(La_{7.4},Sr_{2.6})(Co_{2},Fe_{8})O_{3}$ | $(La_{6.7},Sr_{3.3})(Co_{2},Fe_{8})O_{3}$ | 0.55 | 0.4 | 1.4 | 1.0 | Good |
| 6 | $(La_{7.2},Sr_{2.8})(Co_{2},Fe_{8})O_{3}$ | $(La_{6},Sr_{4})(Co_{2},Fe_{8})O_{3}$ | 0.5 | 0.3 | 1.7 | 1.1 | Fair |
| 7 | $(La_{6.2},Sr_{3.8})FeO_{3}$ | $(La_{6.2},Sr_{3.8})FeO_{3}$ | 0.33 | 0.33 | 1.0 | 1.3 | Poor |
| 8 | $(La_{6.5},Sr_{3.5})FeO_{3}$ | $(La_{6.2},Sr_{3.8})FeO_{3}$ | 0.36 | 0.33 | 1.1 | 0.85 | Excellent |
| 9 | $(La_{7.2},Sr_{2.8})FeO_{3}$ | $(La_{6.7},Sr_{3.3})FeO_{3}$ | 0.5 | 0.4 | 1.3 | 0.8 | Excellent |
| 10 | $(La_{7.4},Sr_{2.6})FeO_{3}$ | $(La_{6},Sr_{4})FeO_{3}$ | 0.55 | 0.3 | 1.8 | 1.15 | Fair |

As shown in Table 1, the deterioration rate of the air electrode could be reduced in samples in which the first ratio Qa at the first portion was at least 1.1 times the second ratio Qb at the second portion. This is because a reduction in the catalyst reaction activity at the second portion could be suppressed as a result of B (boron) being trapped by La contained in the first portion.

Also, among the samples in which the first ratio Qa at the first portion was at least 1.1 times the second ratio Qb at the second portion, in samples in which the first ratio Qa was not larger than 1.6 times the second ratio Qb, the deterioration rate of the air electrode could be further suppressed. This is because the generation of a current density distribution due to a difference in the reaction activity between the first portion and the second portion could be suppressed during electrical conduction, and accordingly the local deterioration of the air electrode could be suppressed.

Furthermore, among the samples in which the first ratio Qa at the first portion was at least 1.1 times the second ratio Qb at the second portion, and in samples in which the first ratio Qa was not larger than 1.3 times the second ratio Qb, the deterioration rate of the air electrode could be further suppressed.

Note that although $SrSO_4$, $Co_3O_4$, CoO, SrO, and the like are known as substances that may cause deterioration of the air electrode, it was confirmed through experiments that the above-described effects can be achieved even if the air electrode contains these substances.

The invention claimed is:

1. An electrochemical cell comprising:
a fuel electrode;
an air electrode containing a perovskite type oxide as a main component, the perovskite type oxide being represented by a general formula ABO3 where A and B represent cation sites, La and Sr are contained at the A site, and at least one of Co, Fe and Mn is contained at the B site; and a solid electrolyte layer arranged between the fuel electrode and the air electrode, wherein the air electrode includes a first portion containing the perovskite type oxide and a second portion containing the perovskite type oxide, the first portion being located on the most upstream side in a flow direction of an oxidant gas that flows through a surface of the air electrode, the second portion being located on the most downstream side in the flow direction, and a first ratio of a La concentration to a Sr concentration of said perovskite type oxide detected at the first portion through Auger electron spectroscopy is from 1.1-1.3 times a second ratio of a La concentration to a Sr concentration of said perovskite type oxide detected at the second portion through Auger electron spectroscopy, such that the perovskite type oxide contained in the first portion is different from the perovskite type oxide contained in the second portion.

\* \* \* \* \*